Aug. 30, 1960      A. D. SINDEN      2,950,809
MATERIAL HANDLING APPARATUS
Filed Jan. 2, 1959      6 Sheets-Sheet 1
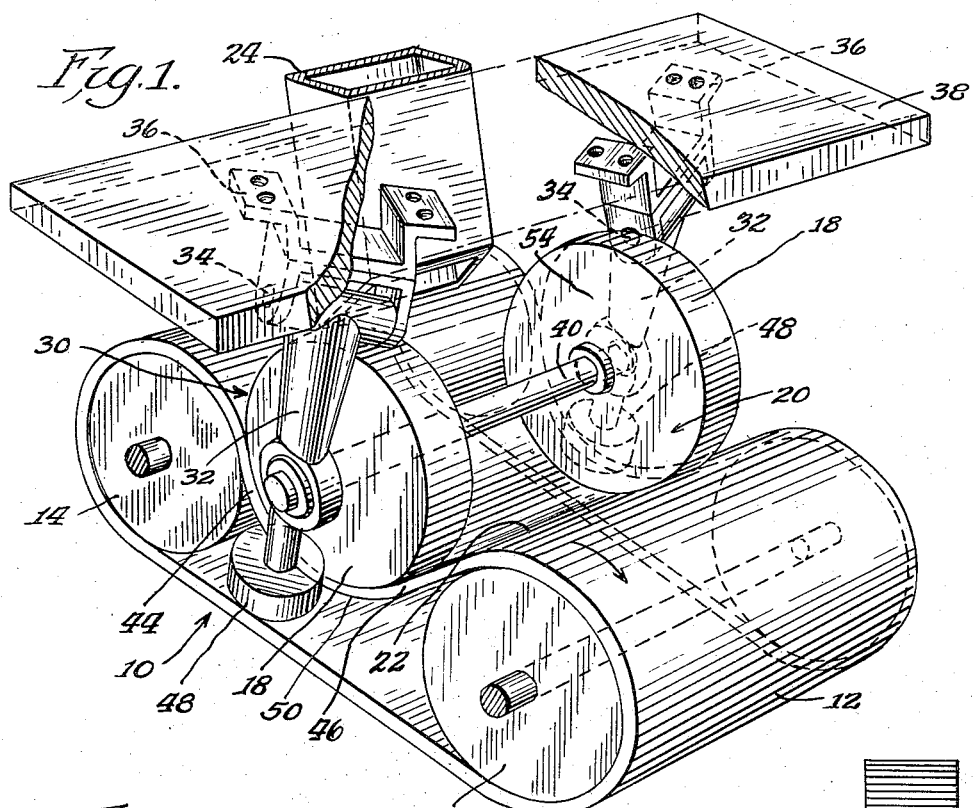
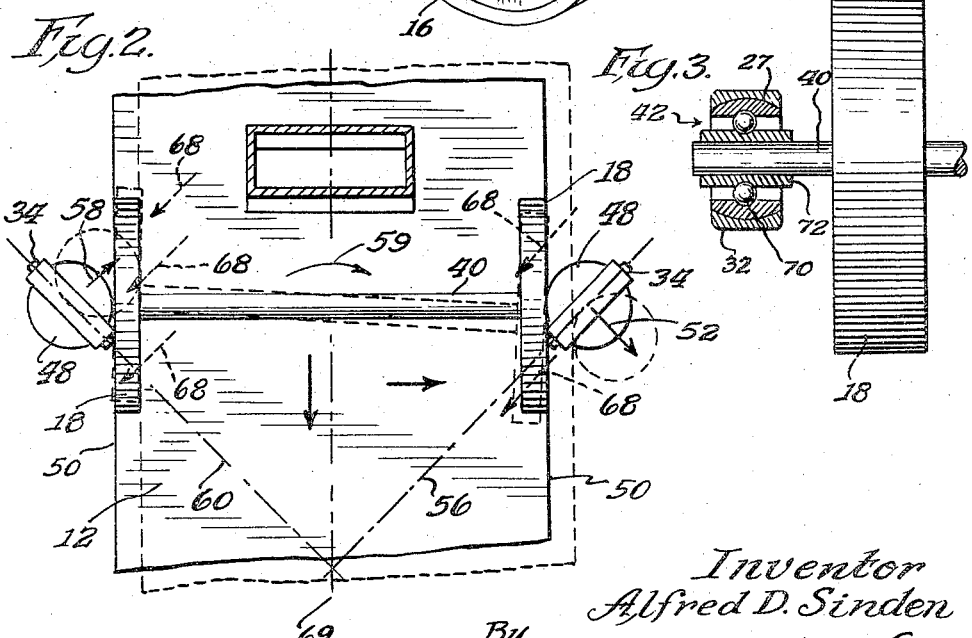
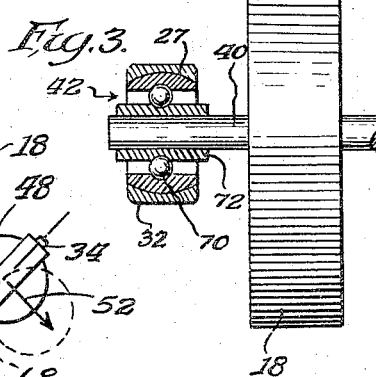
Inventor
Alfred D. Sinden
By Mann, Brown & McWilliams
Attys Aug. 30, 1960          A. D. SINDEN          2,950,809
MATERIAL HANDLING APPARATUS
Filed Jan. 2, 1959          6 Sheets-Sheet 2
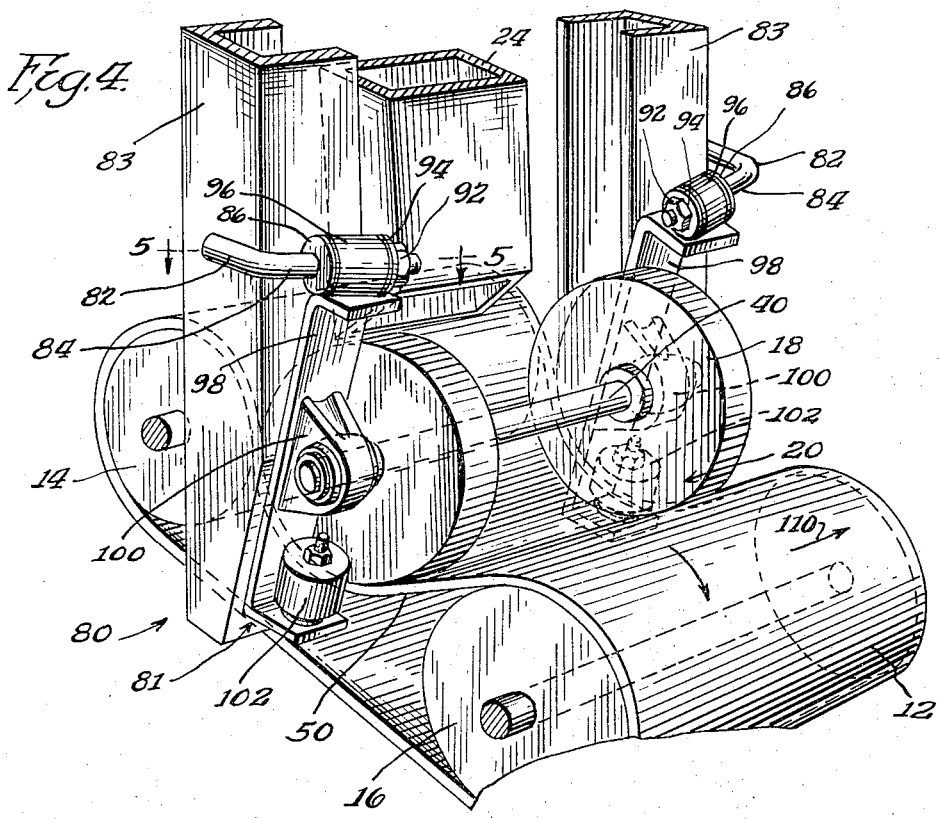
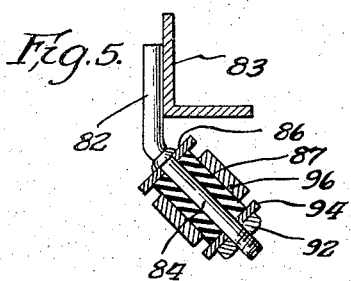
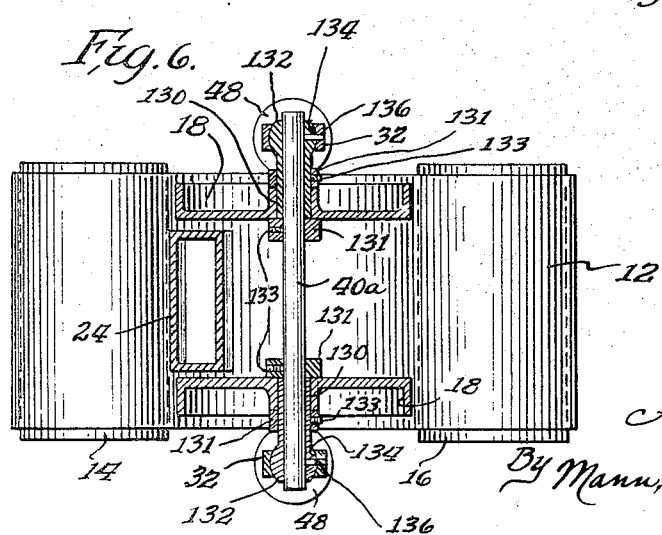
Inventor
Alfred D. Sinden
By Mann, Brown & McWilliams,
Attys.

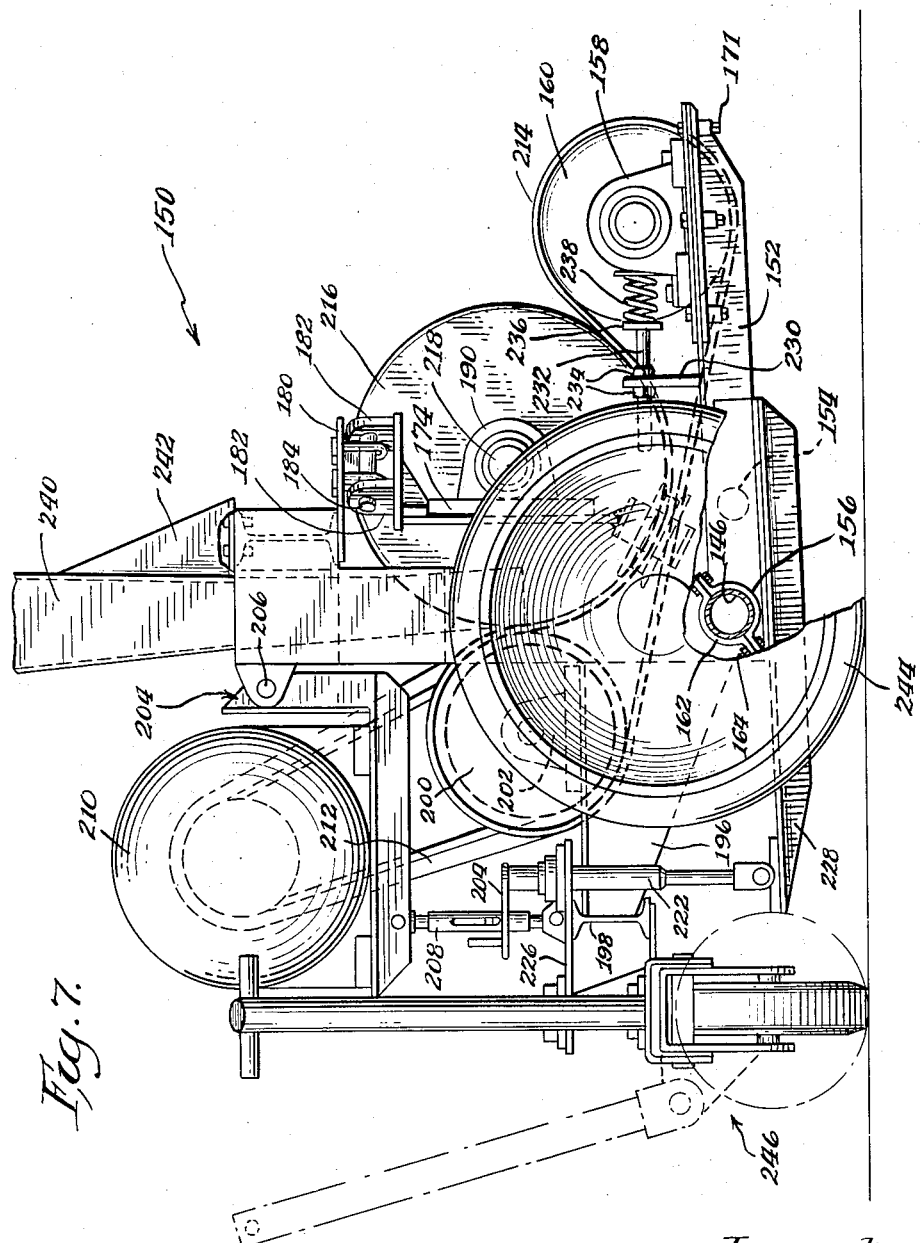

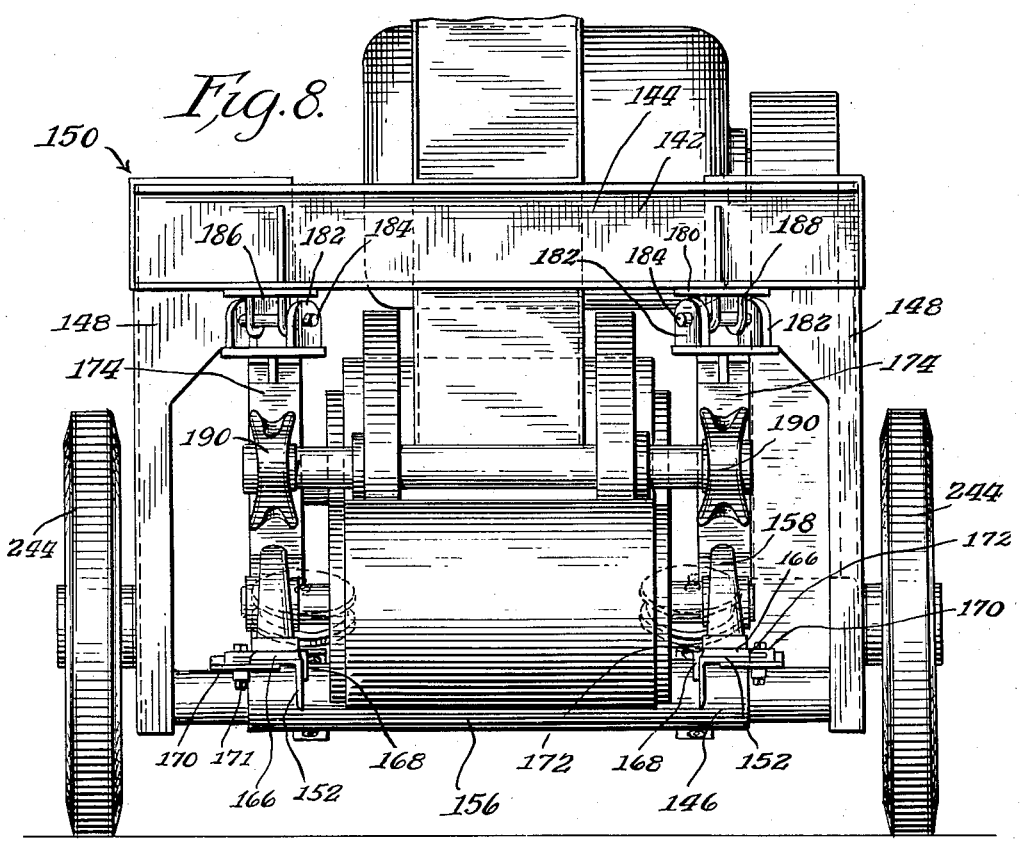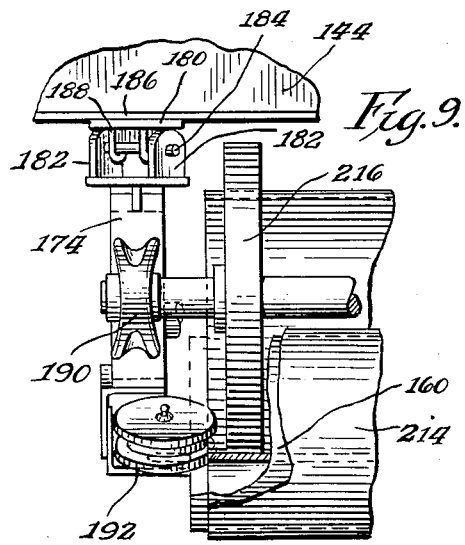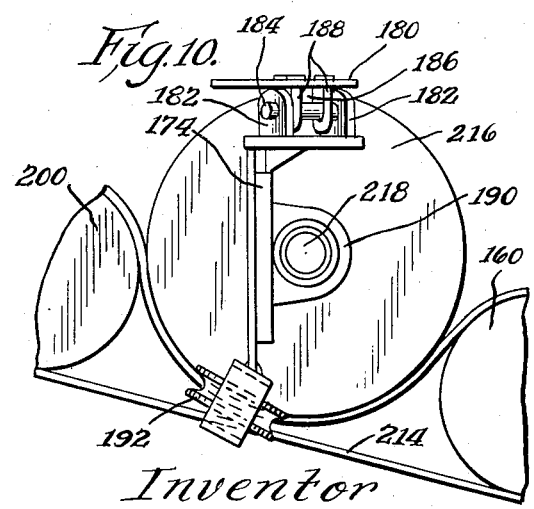

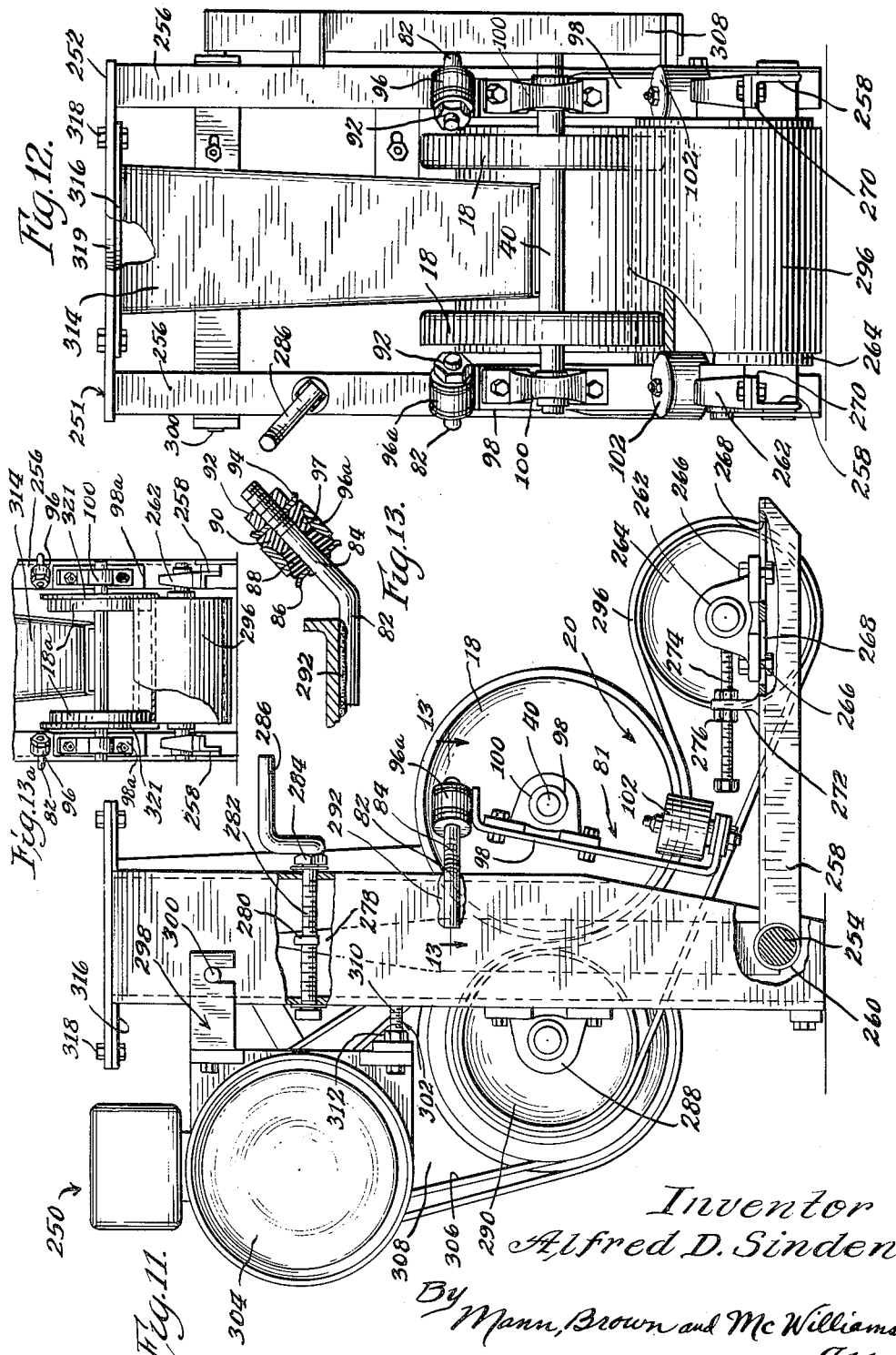

Aug. 30, 1960  A. D. SINDEN  2,950,809
MATERIAL HANDLING APPARATUS
Filed Jan. 2, 1959  6 Sheets-Sheet 6
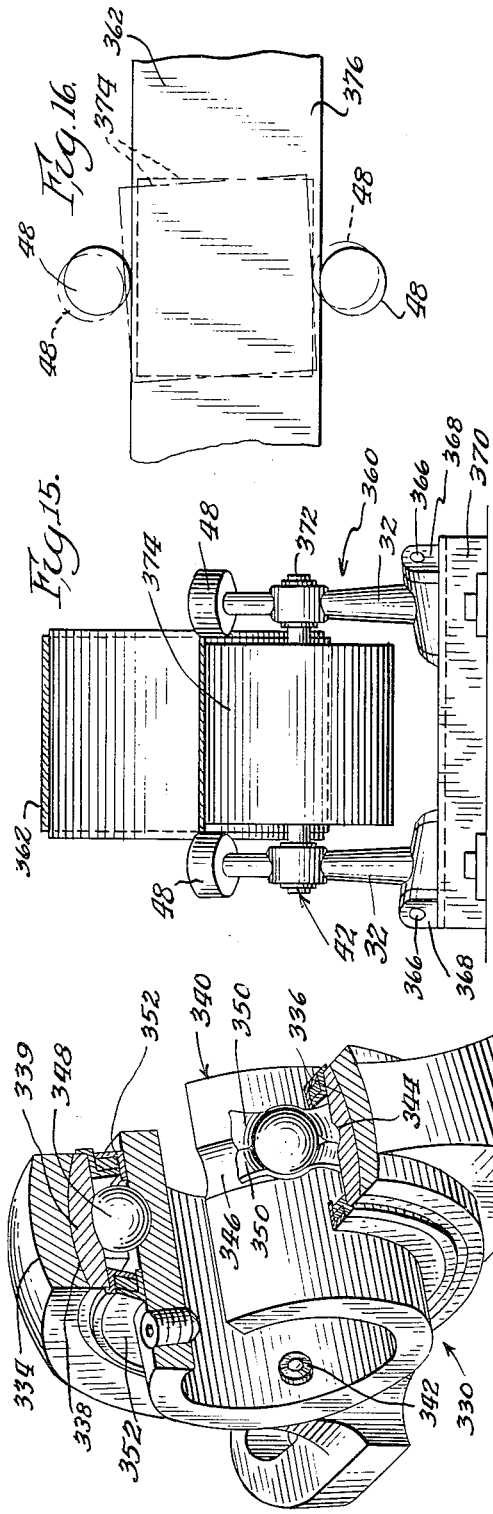
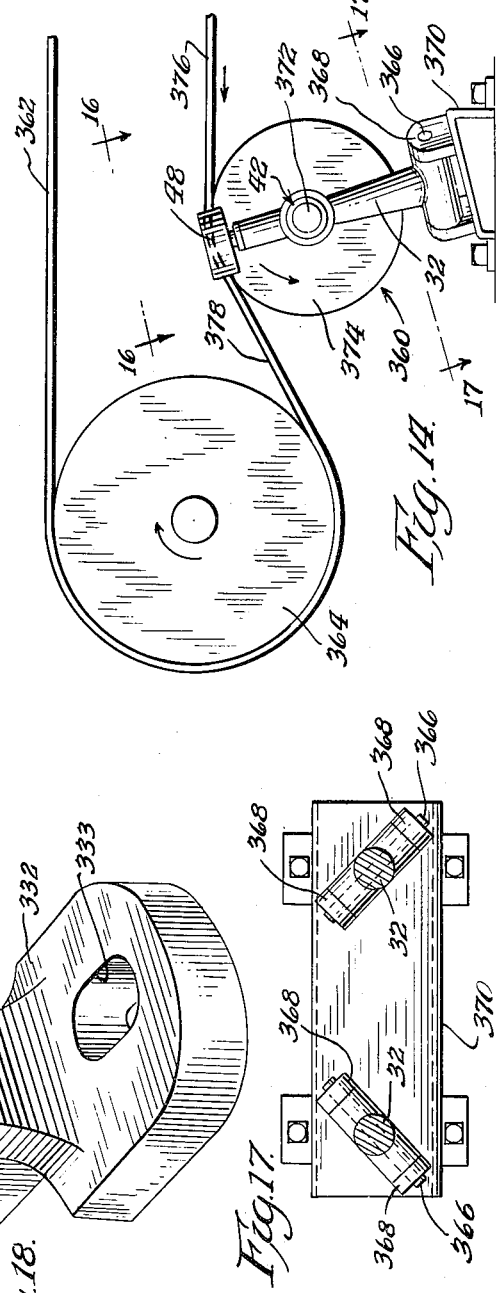
Inventor
Alfred D. Sinden
By
Mann, Brown and McWilliams.
Attys.

United States Patent Office 2,950,809
Patented Aug. 30, 1960

2,950,809

MATERIAL HANDLING APPARATUS

Alfred D. Sinden, Aurora, Ill., assignor to Stephens-Adamson Mfg. Co., a corporation of Illinois Filed Jan. 2, 1959, Ser. No. 784,684

12 Claims. (Cl. 198—202)

My invention relates to thrower apparatus of the type disclosed in my Patent No. 2,467,634, for loading or piling loose bulk material ranging from finely divided pulverant material to coarse material such as coal. More particularly, my invention relates to a self-training device for the conveyor component of such apparatus to keep said conveyor from drifting sidewise on its pulleys.

Thrower apparatus of the type disclosed in the above mentioned patent comprises an endless conveyor trained over spaced pulleys, a pair of spaced discs secured to a common shaft between said pulleys, with the discs being pressed against the upper surface of the upper run of the conveyor to form the conveyor into a material receiving pocket with an inclined throwing surface. The apparatus includes a hopper which directs the material flow between said discs and into said pocket. One of the pulleys is driven by a suitable source of power and this effects a throwing action on the material supplied to the hopper.

A common cause of damage to endless conveyors of the type employed in the above described thrower apparatus, as well as to endless conveyors in general, is the tendency of the conveyors, which ordinarily comprise belts formed from rubber or rubber-like materials, to drift or move sidewise of their pulleys with consequent rubbing or snagging of the belt on chutes, framing, and the like.

One way of preventing drift or sidewise movement of the belts is to employ crowned pulleys. However, experience has shown that crowned pulleys are not completely effective in preventing drift and are objectionable since they put undesirable strains on the belt carcass in addition to those resulting from driving tension and flexing. Rubber belt manufacturers discourage use of crowns on pulleys when a belt is to be stressed near its rating.

Self-training belt supporting idler rollers along the straight run of the belt have also been employed to aid in preventing this objectionable sidewise movement, but since the training force they exert on the belt is limited to the weight of the belt and its load, if any, times the coefficient of friction between the belt and the idler, these idler rolls may frequently fail to hold conveyors of this type in line.

A principal object of my present invention is to provide thrower apparatus employing a highly effective conveyor training device which insures a maximum positive training pressure on the conveyor by employing the tension of the conveyor belt to aid in the training action.

Further objects of the invention are to provide a generally improved thrower apparatus, to provide a self-training device for conveyor belts and the like of general application, which device employs a bend pulley rather than a straight run supporting pulley, and to provide a self-training device for conveyors and the like which is inexpensive of manufacture, efficient in use, and readily adapted to a wide variety of applications.

Other objects, uses and advantages will be obvious or become apparent from a consideration of the following detailed description and the application drawings.

In the drawings:

Figure 1 is a diagrammatic perspective view illustrating the principal components of a thrower apparatus such as that disclosed in the above mentioned patent, showing the principles of my present invention applied thereto;

Figure 2 is a diagrammatic plan view showing the principal components of the apparatus of Figure 1, illustrating in full lines the positions of the components in normal operation position and in dashed lines the positions of such components on belt drift to the right (though the latter is necessarily exaggerated for clarity of illustration);

Figure 3 is a detailed sectional view of one form of disc shaft mounting bearing that may be employed in the embodiment of Figure 1;

Figure 4 is a view similar to that of Figure 1, but illustrating a modified form of apparatus;

Figure 5 is a fragmental sectional view along line 5—5 of Figure 4;

Figure 6 is a horizontal sectional view illustrating a different embodiment of the invention which is actually a modification of the embodiment of Figure 1;

Figure 7 is a side elevational view of a specific embodiment of the form of invention diagrammatically illustrated in Figure 1;

Figure 8 is an end elevational view of the apparatus shown in Figure 7, taken from the right hand side of Figure 7;

Figure 9 is a fragmental view better illustrating the cooperation of the training device of the embodiment of Figure 7 with the thrower conveyor belt;

Figure 10 is a view of the structure shown in Figure 9 taken from the left hand side of Figure 9;

Figure 11 is a side elevational view of a specific embodiment of the form of thrower apparatus diagrammatically illustrated in Figure 4;

Figure 12 is an elevational view of the apparatus of Figure 11 taken from the right hand side of Figure 11;

Figure 13 is a fragmental cross-sectional view along line 13—13 of Figure 11, parts being shown in elevation;

Figure 13a is a fragmental view illustrating a modification of the thrower discs, the showing being similar to the corresponding structure of Figure 12;

Figure 14 is an elevational view of a further embodiment of the invention applied to a conveyor belt of general utility adjacent the tail pulley thereof;

Figure 15 is an elevational view taken from the right hand side of Figure 1, partially in section;

Figure 16 is a diagrammatic view along line 16—16 of Figure 14;

Figure 17 is a sectional view along line 17—17 of Figure 14; and

Figure 18 is a diagrammatic perspective view illustrating a specific form of self-aligning pillow block bearing unit that may be employed in several of the illustrated embodiments of the invention.

*General description*

Referring now to Figure 1 of the drawings, reference numeral 10 generally indicates one form of thrower apparatus of the type described in my above mentioned patent, but improved in accordance with the principles of my present invention. The apparatus 10 generally comprises an endless conveyor in the form of a short, high speed belt 12 trained over spaced end pulleys 14 and 16, one of which is driven in any suitable manner to move the conveyor in the direction of the arrow of Figure 1. The outer surface of the upper run of the conveyor is engaged by spaced discs 18, which are pressed against the belt to form the belt into a material receiving pocket 20 with an inclined throwing surface 22. During operation of the apparatus, the belt 12 is actuated to move at high speed, and bulk material is delivered to chute or spout 24 from which it passes into the belt pocket 20 formed by discs 18 in the rapidly moving belt. The bulk material meets the belt while traveling substantially in the same direction that the belt is moving, which maintains the original momentum of the bulk material, and as the bulk material travels around the concave portion of the belt, it quickly attains belt speed. The action thereby provided on the bulk material causes it to be thrown away from the thrower apparatus in a continuous stream for a distance that depends on belt speed, the nature of material, and the manner of feeding the thrower.

A more specific description of the throwing action on the material may be obtained by referring to my above mentioned patent as well as my earlier granted Patent No. 1,597,393, though it may be mentioned that apparatus of this type is widely used to load and trim boxcars and storage bins, or pile the material where desired.

In accordance with my present invention, the two discs or wheels 18, which in effect form pulley means (or a pulley means member), are arranged to provide a training action on the belt 12. The discs or wheels 18 form a part of self-training device 30 which also includes a support member formed in part by a pair of arms or levers 32 pivoted at adjacent ends to pins 34 in brackets 36 fixed to a suitable support 38, which is only diagrammatically illustrated in Figure 1, but ordinarily comprises a portion of the frame of the thrower apparatus. The discs or wheels 18 are keyed to shaft 40 in any suitable manner, and shaft 40 is secured between arms or levers 32 in suitable self-aligning bearing units 42.

The pins 34 form pivotal axes about which the arms or levers 32 pivot and are positioned at an angle with respect to each other rather than being aligned, approximately 90 degrees in the illustrated embodiment. The axes of the pins 34 converge generally in the direction of travel of the portion of the conveyor engaged by the discs or wheels 18, said axes intersecting adjacent the center line of the belt 12. Said axes of pins 34 also are inclined at substantially equal angles to the center line of the conveyor, approximately 45 degrees as illustrated, though this is not critical. The pins 34 are preferably disposed in a plane which is parallel to the axis of rotation of the shaft 40 and which is perpendicular to the longitudinal axes of the levers or arms 32 when they are in normal operating position; in such position, they preferably are aligned in a plane that lies along the bisector of the angle formed by the running on and running off portions 44 and 46 of the conveyor belt 12.

Preferably, the arms or levers 32 are arranged so that they are substantially parallel in normal operating position.

Each arm or lever 32 at its free end carries an antifriction roller 48 positioned in alignment with and preferably in contact with the respective sides 50 of the belt.

The self-training device 30 is mounted and adjusted so that when the belt 12 is running on center, the pulley means comprising discs or wheels 18 is square with the center line of the belt, and the levers or arms 32 are preferably, though not necessarily, aligned in the plane that includes the axis of rotation of shaft 40 and bisects the angle between the running on and running off lengths 44 and 46 of the belt.

If the belt 12 should tend to drift to the right (as the device is viewed in Figures 1 and 2), the right hand roller 48, and the lever 32 on which it is mounted, will tend to move in the direction of arrow 52 of Figure 2, this being the only movement permitted under these circumstances by pin 34 of the right hand side lever 32. Thus, the right hand side lever 32 will tend to pivot about axis 56 of the right hand side (as viewed in Figure 2) pin 34, and as the levers 32 are tied together by the shaft 40 and the self-aligning bearings 42, the left hand side arm 32 will tend to pivot in the direction of arrow 58 of Figure 2. The axis 60 of the left hand side pin 34 under these circumstances insures that the left hand side arm 32 will swing only in the direction of arrow 58; it will thus be seen that the pulley means formed by the discs or wheels 18 and shaft 40 will tend to twist or swivel somewhat in the direction of the arrow 59 due to the thrust applied to the shaft 40 by levers 32 through the bearings 42.

The position of the pulley means comprising the discs 18 and shaft 40 that tends to be effected by this interplay of forces has the effect of steering the belt 12 to the left of Figure 2 since the discs 18 will then apply a substantial sidewise force on the belt as illustrated by the arrows 68 of Figure 2, which counteracts the drift of the belt.

In the embodiment of Figures 1 and 2, the axes 56 and 60 of pins 34 are in a common plane and they intersect at line 69 which is in the same vertical plane as the center line of conveyor 12.

On drift in the opposite direction, the self-training action of the pulley means formed by discs 18 and shaft 40 is the same but operates in a reverse manner.

It will be seen that since the motion of one bearing unit 42 is carried through the shaft 40 to the other bearing unit 42, both levers 32 are forced to move, or swing simultaneously but since the pins 34 are oppositely inclined, the ends of shaft 40 are urged in opposite directions. The sidewise force on the belt counteracting drift will be the net pressure of the belt against the discs resulting from the belt tension times the friction factor of the belt on the discs 18. It is therefore evidence that sufficient tension must be maintained on the belt to hold it firmly against the discs. Furthermore, the belt should be stiff enough to resist any tendency to bend or fold as it presses against a roller 48.

A suitable form of bearing unit 42 is diagrammatically illustrated in Figure 3, which illustrates ball bearings 70 separating inner race 72 fixed in any suitable manner to shaft 40 and outer race 27 universally mounted in the respective arms or levers 32.

The apparatus 80 of Figure 4 provides results that are similar to that of the apparatus of Figure 1, though a modified belt training device 81 is employed. Apparatus 81 includes pulleys 14 and 16, belt 12, discs or wheels 18 and shaft 40. The discs or wheels 18 form the material receiving pocket 20 into which the material being thrown or piled is deposited by hopper 24.

The embodiment of Figure 4 includes a pair of angled pins 82 (see Figure 5) mounted in any suitable manner on frame members 83; each pin 82 has a portion 84 that corresponds to pins 34 of Figure 1. Pin portions 84 are thus inclined with respect to each other and their axes converge in the direction of movement of the portion of belt 12 engaged by the discs or wheels 18 of this embodiment of the invention. Pin portions 84 are also coplanar.

Each pin portion 84 carries a fixed washer 86 (see Figure 5), a rubber bushing 87 and a compression adjusting nut 92 that bears against washer 94 which in turn presses against the bushing 87. A sleeve 96 is received over each bushing 87, the sleeves 96 being respectively fixed to depending arms or levers 98 which each carry an appropriate form of self-aligning bearing 100 (such as the unit shown in Figure 18) and an anti-friction roller 102 that corresponds in function to the roller 48 of Figure 1.

Shaft 40 is journalled at its ends in the respective bearings 100 and rollers 102 are placed in contact with the respective sides 50 of the belt.

The pivotal connections of arms or levers 98 are provided to preclude metal to metal contact between these arms or levers and their respective pivots. In this embodiment of the invention, which is designed for use in those instances where the arms or levers 98 will swing only on the order of three degrees or less, the swinging movement is taken up entirely in the bushings 87, there being no relative movement between the bushings 87 and the respective pin portions 84. This completely eliminates the need for lubrication at the arm or lever pivots, while at the same time prevents wear on pin portions 84. Of course, adjustment of nut 92 adjusts the compression on bushing 87, which in turn adjusts the pivotal action permitted, and the pressure that the individual bushings 87 apply to the respective sleeves 96 and pin portions 84. The nuts 92 should be sufficiently tight so that bushings 87 will not slip about pin portions 84.

On drift of the belt 12 to the right or left of Figure 4, a training action takes place that is identical to that previously described.

One of the essential features of the invention is that a universal joint-like action be provided between the pulley means and the pivotal supports of the supporting arms or levers 32 or 98. This universal joint-like action should be at the shaft 40, as shown in the embodiments of Figures 1 and 4.

The embodiment of Figure 6 illustrates a further form of the invention, which includes essentially the same components as those employed in Figure 1 except that discs 18 are rotatably mounted on shaft 40a by appropriate plain bearings 130 between collars 131 fixed to shaft 40a as by screws 133. In the embodiment of Figure 6, the bearing forming structure is provided with a ball-shaped portion 132 at each end thereof that is received in a complementary spherically contoured socket 134 formed in the respective arms 32. A suitable pin 136 keys the shaft 40a and bearing 130 to the respective arms 32 against rotational movement.

The embodiment of Figure 6 operates in the the same manner as the embodiment of Figure 1, the universal joint-like action being provided by the universal joint structure formed by components 132 and 134, though discs 18 rotate with respect to shaft 40a.

*Specific embodiments of the invention*

Figures 7–10 illustrate a specific thrower apparatus 150 of the type diagrammatically illustrated in Figure 1. An apparatus 150 comprises frame 142 including upper cross member 144, lower tubular cross member 146 and spaced side members 148 rigidly united to form a unitary structure.

Spaced angle members 152, joined together by tubular brace 154 and elongate half sleeve 156, each slidably carry a conventional pillow block type bearing unit 158 which journal pulley 160, that corresponds to pulley 16. The framework provided by the angle members 152 and cross members 154 and 156 is rotatably mounted to the tubular frame cross member 146 by appropriate half sleeve elements 162 secured to the half sleeve component 156, as by appropriate bolts 164. The pillow block bearing unit 158 of each angle member 152 is fixed to a plate 166 (see Figure 8) which is slidably mounted on the underlying angle member 152, as by being received between plates 168 and 170. Plates 166, 168 and 170 are formed with cooperating complementary inclined surfaces 172 which slidably retain plate 166 in operating position on each side of the conveyor. Plate 168 of each angle 152 may be welded in place, while plates 170 may be mounted in position by appropriate bolts 171.

The arms or levers 174, which correspond to arms or levers 32, are suspended from top cross member 144. This may be done by fixing plates 180 to the member 144 and providing the arms or levers 174 with pierced lugs 182 that are adapted to receive pins 184 that correspond to pins 34. In the embodiment of Figure 8, a bar 186 is welded to the undersurface of each plate 180 and U-bolts 188 are employed to draw pin 184 on each side of the conveyor up against the respective blocks 186.

The arms or levers 174 each carry a self-aligning bearing unit 190 of the type shown in Figure 18. Units 190 may be fixed to the arms or levers 174 in any suitable manner. Arms or levers 174 also rotatably mount anti-friction rollers 192 that correspond in function to rollers 48.

On the other side of the machine, a pair of spaced plates 196 extend outwardly of the apparatus main frame, the outer ends of which are joined by an appropriate framing member 198. Pulley 200, which corresponds to pulley 14 of Figure 1, is journalled in appropriate bearings 202 mounted in any suitable manner on these members. The apparatus frame also carries a power unit supporting structure 204, pivotally mounted as at 206 and held in adjusted position by turnbuckle unit 208. The structure 204 carries appropriate motor 210, which may be of any suitable type, and which drives pulley 200 through a pulley belt or chain 212 engaging appropriate sheaves or sprockets.

Belt 214 is trained over pulleys 160 and 200 and is engaged along its upper surface by spaced discs or wheels 216 that correspond to discs or wheels 18 of Figure 1. Discs or wheels 216 are keyed in any suitable manner to shaft 218 which is journalled at its ends in self-aligning bearings 190.

A conventional form of screw jack 222 operated by handle 224 is interposed between plate 226 fixed to cross member 198 and an extension 228 fixed to the framing members 152. Operation of the jack 222 effects a change in the angle of throw provided by the apparatus 150.

The members 152 adjacent bearing units 158 each carry an upright bar 230 which screw threadedly carries threaded rod 232 that is held in adjusted position by lock nuts 234. The rods 232 each carry a disc-like head 236 which engages a compression spring 238 that is interposed between the bearings 158 and the rods 232 on each side of the conveyor. The belt 214 is thus tensioned against the compression springs 238, and tension in the belt may be adjusted by adjusting the position of screw threaded rods 232.

The apparatus 150 includes an appropriate form of hopper structure 240 which is held in the desired position by a bracket 242 fixed in any suitable manner to the top framing member 144. The hopper 240 corresponds in function to hopper 24 of Figure 1.

The apparatus 150 is provided with appropriate supporting wheels 244 at its sides and appropriate steering wheel unit 246 that is diagrammatically illustrated in Figure 7. This permits the unit 150 to be moved from place to place along the ground or other supporting surface. Preferably, the unit 246 includes an appropriate device for latching this wheel unit in the solid line position of Figure 7 during operation of the apparatus so that the apparatus may be moved to direct the throw of the material horizontally as desired.

When a thrower apparatus 150 is in operation, the belt training device forming a part of it functions in the same manner as described in connection with the embodiment of Figure 1.

The showing of Figures 11, 12 and 13, is a specific embodiment of the form of the invention suggested by Figure 4. Apparatus 250 of Figures 11–13 comprises a frame 251 formed by a top plate 252, a bottom rod 254 and spaced channel members 256, all united in any suitable manner to form a strong unitary structure. At the lower portion of the apparatus, angle members 258 are fixed at their inner ends to sleeve or tube 260 which is received over rod 254. Angle members 258 slidably carry bearing units 262 which journal pulley 264 that corresponds in function to pulley 16 of Figure 4. The bearing units 262 are mounted in place by appropriate bolts 266 extending through elongated holes 268 formed in the horizontal flanges 270 of members 258. Members 258 each carry an upright member 272 that screw threadedly receives threaded rod 274, one end of which bears against the adjacent bearing unit 262. Suitable lock nuts 276 hold the rod 274 in adjusted position. Adjustment of the tension in belt 296 may be achieved by loosening bolts 266 and actuating rod 274 to move pulley 264 as desired, after which bolts 266 are retightened.

On one side of the apparatus frame, an upright arm 278 is welded to tube or sleeve 260. Arm 278 carries an internally screw threaded lug 280 which screw threadedly receives threaded bolt 282 that is journalled in the side frame member 256 in any suitable manner. The head 284 of bolt 282 carries crank handle 286 for rotating the bolt 282 whereby the arm 278 swings to vary the elevation of pulley 264 and thus vary the angle of the throw of the thrower.

The frame side members 256 have secured thereto a pair of pillow block bearing units 288 which journal pulley 290 that corresponds to pulley 14 of Figure 4.

Angled pins 82 of training device 81 are fixed to the respective frame side members 256 in any suitable manner, as by welding at 292. As already described in connection with the showing of Figure 4, the pins include the angled portions 84 that mount the bushings over which are received the sleeves 96a of the arms or levers 98. In the showing of Figure 13, the bushings are in the form of two sections 88 and 90, which together with the internal surface 97 of sleeves 96a are shaped to improve frictional contact between the bushings, the sleeves 96a and pin portions 84 when nuts 92 are turned up against washers 94. The arms or levers 98, discs 18 and shaft 40 of Figure 11 may be otherwise considered the same as shown in Figure 4.

Belt 296 is trained over pulleys 290 and 264, with the discs 18 engaging same to form the material receiving pocket 20.

The apparatus frame to the left of Figure 11 carries a suitable motor support structure 298 pivoted as at 300 on each side of the apparatus and provided with adjustable stops 302 at each side of the apparatus. The structure 298 carries an appropriate power unit 304, such as a gasoline engine, which drives pulley 290 through an appropriate pulley belt or chain 306 engaging conventional sheaves or sprockets. A guard 308 is fixed to the frame in any suitable manner to cover the pulley belt or chain 306.

The adjustable stop 302, which comprises a screw threaded stud 310 and lock nut 312, is adjusted to adjust the tension on the pulley belt or chain 306.

Hopper structure 314 includes a flange 316 that is secured to the undersurface of frame plate 252 as by appropriate bolts 318.

In use, the apparatus of Figures 11–13 is associated with, for instance, car loading apparatus of the type contemplated by my said Patent No. 2,467,634. During operation of the apparatus, bulk material is supplied to hopper 314 through a hole 319 in plate 252, the hopper guiding the bulk material into pocket 20 of the thrower. The throwing action of the apparatus and the training action on the belt 296 are the same as previously described in connection with Figure 4.

In the embodiment of Figure 13a, the discs 18a are provided with flanges 321 that engage the sides of the thrower belt, thereby replacing rollers corresponding to rollers 48 or 102. This arrangement, when applied, for instance, to the thrower of Figures 11–13, permits the use of a shorter arm or lever 98a and makes more room for angle members 258 where compactness is important. On drift of belt 296, the same training action previously described occurs, though the motion of the belt is transmitted to the arms or levers 98a through disc flanges 321. The twisting action of the discs 18a is so slight that flanges 321 will not gouge the edges of the belt, though it is desirable to round off the edges of flanges 321.

Figure 18 diagrammatically illustrates a pillow block type bearing unit suitable for use as bearing unit 100 in the embodiment of Figure 11 or bearing unit 190 in the embodiment of Figure 7. The pillow block unit 330 of Figure 18 comprises a base 332 provided with openings 333 to receive mounting screws or bolts. Rising from the face 12 is an integral bearing housing portion 334 having a circular, spherically contoured opening 336 formed therein which coacts with the correspondingly shaped convex surface 338 of the outer race 339 of the bearing assembly.

The spherical shape of the face 338 of the outer race and the face 336 of the housing portion 334 permit the bearing assembly as a whole to have limited universal movement with respect to the pillow block unit as a whole so that the bearing unit may adjust itself to angular positions.

The inner race of the bearing assembly is indicated at 340 and comprises a tubular sleeve which projects outwardly of the pillow block to accommodate shaft screws 342 that permit a shaft, such as shaft 40, to be locked within the inner race 340.

The outer race 339 is provided with a bearing groove 344 while the inner race has a corresponding groove 346 in which ball bearings 348 are adapted to travel. The balls within the bearing unit are maintained in proper spaced relation by retaining rings 350 which are riveted or clamped together in a conventional manner. Sealing rings 352 complete the bearing assembly.

Figures 14–17 illustrate the principles of my invention applied to a conveyor adapted for general conveying operations. Reference numeral 360 indicates a self-training bend pulley unit applied to endless conveyor belt 362 that is trained over suitable end pulleys, including tail pulleys 364, and intervening idlers or slider plates. The unit 360 comprises arms 32 of the embodiment of Figure 1 pivoted at adjacent ends to pins 366 in brackets 368 fixed to suitable supports 370. Shaft 372, similar to shaft 40 of the embodiment of Figure 1, is mounted between arms or levers 32 by self-aligning bearings 42 in the same manner as shown in Figure 1. Shaft 372 carries bend pulley 374 which engages the lower run of conveyor 362 with substantial wrap. As in the embodiment of Figure 1, the pins 366, which form the pivotal axes about which arms or levers 32 pivot, are positioned at an angle with respect to each other, rather than being aligned, approximately 90 degrees in the illustrated embodiment; these pins 366 are likewise disposed in a plane which is parallel to the axis of rotation of the shaft 372 and which is perpendicular to the longitudinal axes of the levers or arms 32 when they are in normal operating position. Preferably, the levers or arms 32 in the device 360 are arranged so that in normal operating position they are substantially parallel and in the specific device 360 illustrated, the said longitudinal axis of each lever or arm 32 bisects the angle formed by the running on and running off lengths 376 and 378 of the belt 362, and the plane that the levers or arms 32 are disposed in is generally perpendicular to the plane of pins 368. Each lever or arm 32 carries at its free end an anti-friction roller 48, as in the embodiment of Figure 1, these rollers 48 being positioned in alignment with and preferably in contact with the sides of the belt as shown in Figure 15.

The self-training unit 360 is mounted and adjusted so that when the belt 362 is running on center, the pulley 374 is square with the center line of the belt 362, as shown in dashed lines in Figure 16, and the levers or arms 32 are substantially aligned in a plane that includes the axis of rotation of shaft 372 and bisects the angle between the running on and running off lengths 376 and 378 of the belt 12, this being the normal operating positions of the self-training unit 360. If the belt 362 should drift to the right of Figure 15, the right hand roller 48 will tend to be moved to the right and the respective rollers 48 and pulley 374 will tend to take the positions shown in broken lines in Figure 16. This tendency of rollers 48 and pulley 374 to take the new positions illustrated will have the effect of steering the belt 362 sidewise toward the left of Figure 15, since the then inclined pulley 374 will place a substantial sidewise force on the belt, thus counteracting drift. The self-training action is thus the same as described in connection with the embodiment of Figure 1.

On drift of the belt 362 in the opposite direction, the self-training unit functions in a similar manner to oppose drift in that direction.

*Distinguishing features and advantages of the invention*

It will be noted that the discs of the embodiment of Figures 1–13a and the bend pulley of the embodiment of Figures 14–17 engage the conveyor with substantial wrap, which is to be distinguished from the engagement of an idler pulley merely supporting, for instance, either the upper or lower runs of the conveyor. The term "substantial wrap" as employed in the specification and claims means that amount of wrap of the conveyor about the pulley means employed which would cause more pressure between the conveyor and the pulley means than would be caused by the weight of the conveyor and its load alone. The drawing illustrations all show substantial wrap within the meaning of this definition.

Since the pressure on a bend pulley necessarily results, to a large extent, from the belt tension applied to the belt by the bend pulley, it will be appreciated that the steering effect of such a pulley means is much more positive than it could be from an idler pulley that merely supports the conveyor. Moreover, since the rate of sidewise movement of the conveyor is proportional to the deflection of the bend pulley means shaft from a position perpendicular to the center line of the belt, the training action provided by a swivelling action of such a pulley means is much more positive than any practical crown on a terminal pulley 364 or pulleys 14 and 16 could be.

Parenthetically, it may be mentioned that the discs 18, 18a and 216, and shafts 40 and 218 form bend pulley means in the same sense that pulley 374 of Figure 14 does.

While the angle at which the pins 34, pin portions 84, or pins 366 are inclined with respect to the center line of the conveyor is shown as being approximately 45 degrees, this angle could be varied between rather wide limits, for instance, 20 degrees to 70 degrees, though in any particular case the axes about which the arms or levers, for instance, 32 or 98 pivot should converge in the direction of movement of the portion of the conveyor engaged by the bend pulley means, and said axes should intersect at approximately the center line of the conveyor, making substantially equal angles with said center line. Moreover, though the arms or levers 32 and 98 are illustrated in the embodiments of Figures 1, 4 and 14 as substantially bisecting the angle formed by the running on and running off portions of the belt, this position is not critical to the functioning of the device, since the embodiments of Figures 7 and 11 function in an equivalent manner, although their arms or levers 174 and 98 are not so positioned. However, if the arms or levers are mounted for normal positioning in the plane of this angle bisector, resistance to swivelling of the pulley means is reduced to a minimum.

While the anti-friction rollers 48 are illustrated as being in line with their arms or levers 32, this positioning is likewise not essential since the embodiments of Figures 7 and 11 function in the same manner as the embodiments of Figures 1 and 14. The only actual requirement in this respect is that the belt of the conveyor, on drifting sidewise, will contact with means (which may be disc flanges 321 of Figure 13a rather than, for instance, rollers 48 or 102) that will be operative to tend to swing, for instance, the arms or levers 32 or 98 in a direction to dispose the bend pulley means in a position to oppose drift.

In all of the illustrated embodiments of the invention, in the event that substantial movement of arms or levers 32 or 98 away from their normal operating position should occur, the axes of the several bend pulley means illustrated will tend to retract somewhat from the conveyor as the levers or arms pivot on drift of the respective endless conveyors, and also, the respective axes retract uniformly along their lengths and do not cock or twist to an inclined position with respect to the plane of the respective axes on normal operation. This will simultaneously avoid a canted belt surface at the bend pulley means which would materially increase the tension on one side of the pulley, and keep any increase in tension over the transverse cross section of the conveyor at a minimum.

It may be added, however, that during normal operation, the movement of the arms or levers of all embodiments of the invention, in counteracting drift, is so slight as to be barely perceptible.

The several belt training device embodiments shown in the drawings may be used interchangably where consistent with design requirements. Thus, the modifications of Figures 4 and 13a may be employed together in a single thrower unit, or embodied in conveyor trainer 360.

Preferably, the high speed shafts of pulleys 14, 16, 160, 200, 264 and 290 are mounted in self-aligning ball bearing units of the type shown in Figure 18. Such bearings are made and sold under the trademark "Sealmaster" by Stephens-Adamson Mfg. Co. of Aurora, Illinois.

This application is a continuation-in-part of my application Serial No. 500,563, filed April 11, 1955, the disclosure of which is hereby specifically incorporated herein by this reference.

The term "swivelling" as employed in the appended claims means a turning or swinging action with respect to the conveyor, but is not limited to such movement about a definite center or axis.

The foregoing description and the drawings are given merely to explain and illustrate my invention and the invention is not to be limited thereto, except insofar as the appended claims are so limited, since those skilled in the art who have my disclosure before them will be able to make modifications and variations therein without departing from the scope of the invention.

I claim:

1. An endless conveyor aligning device comprising pulley means mounted on a swivelling support and engaging said conveyor with substantial wrap, said support comprising a pair of pivotally mounted levers extending toward the conveyor, said levers being mounted for pivotal movement about axes that are contained in a plane disposed substantially normally of said levers, said axes converging to a point adjacent the center line of the conveyor in the direction of movement of the portion of the conveyor engaged by said pulley means, said support including means on each side thereof between which said conveyor is trained and which is adapted to be engaged by the conveyor on drift thereof to swing said levers in the direction of drift.

2. A conveyor belt aligning device comprising a pair of levers mounted at like ends for pivotal movement about axes that are at an angle to each other, and pulley means mounted between said levers through self-aligning bearings, said pulley means engaging said belt, said axes converging in the direction of movement of the portion of the conveyor belt engaged on said pulley means, said levers having their free ends extending adjacent the conveyor belt for engagement by the belt on drift thereof to swing the levers about their pivotal mountings in the direction of drift.

3. An endless conveyor aligning device comprising roller means engaging the conveyor, a pair of spaced arms in alignment with a plane substantially bisecting the angle between the running-on and running-off lengths of the conveyor, said roller means being rotatably mounted between said arms through self-aligning bearings, said arms being mounted for pivotal movement about substantially coplanar axes that are positioned at an angle to each other and that converge in the direction of movement of the portion of the endless conveyor that is engaged by said roller means, the plane of said axes being substantially perpendicular to the first mentioned plane, said axes intersecting adjacent the center line of the conveyor, said arms including means positioned adjacent each side of the conveyor with which the respective edges of the conveyor engage upon drift of the conveyor to swing said arms in the direction of drift, said arms being substantially aligned with said first mentioned plane during normal operation of the conveyor but tending to swing out of said first mentioned plane when the last mentioned means of one of said arms is engaged by the conveyor on drift thereof, and thereby retracting said roller means in a direction away from said conveyor a corresponding amount.

4. A self-training bend pulley for an endless conveyor comprising a pair of substantially parallel arms secured at like ends for pivotal movement about coplanar axes that are at an angle to each other, self-aligning bearings carried by each arm intermediate the ends thereof, and pulley means mounted in said bearings over which the conveyor is trained, said axes converging in the direction of movement of the portion of said endless conveyor engaging said pulley means and being inclined at substantially equal angles with respect to the center line of the conveyor, said arms including means at the other ends thereof adapted to be engaged by the conveyor upon drift thereof to swing said arms about their respective mountings, said arms being substantially parallel during normal operation of the conveyor, but swinging out of parallelism when said last mentioned means of one of the arms is engaged by the conveyor on drift thereof.

5. In conveyor apparatus including an endless conveyor trained over a pair of pulleys, a pair of spaced apart discs engaging the upper run of the conveyor to form the conveyor into a material receiving pocket with an inclined throwing surface, and a chute leading into said pocket, the improvement wherein said discs are secured to a shaft rotatably mounted between a pair of arms through self-aligning bearings, said arms extending toward said conveyor and being mounted at the ends thereof remote from the conveyor for pivotal movement about coplanar axes that are positioned at an angle to each other and converge in the direction of movement of the upper run of the conveyor, said axes being inclined at substantially equal angles with respect to the center line of the conveyor, said arms including means adapted to be engaged by said conveyor on drift thereof to swing said arms in the direction of drift.

6. Thrower apparatus comprising frame means, a pair of spaced apart pulleys journalled on said frame means, an endless conveyor trained over said pulleys, a pair of discs spaced apart laterally of the conveyor and engaging the upper run of the conveyor with substantial wrap to form the conveyor into a material receiving pocket with an inclined throwing surface, a chute leading into said pocket, said discs being secured to a common shaft, said shaft being secured between a pair of spaced apart arms extending toward said pocket, said frame means carrying means for mounting the ends of said arms remote from the conveyor for pivotal movement about axes that converge generally in the direction of movement of the upper run of the conveyor, said arms including means adapted to be engaged by said conveyor on drift thereof to swing said arms in the direction of drift, and means for effecting a universal joint-like action between said shaft and said axes, respectively.

7. The apparatus set forth in claim 6 wherein the last mentioned means comprises self-aligning bearings coupling said shaft to the respective arms.

8. The apparatus set forth in claim 6 wherein said discs are journalled for rotation on said shaft, and including ball and socket joint means between said shaft and the respective arms.

9. The apparatus set forth in claim 6 wherein the second mentioned means comprises flexible bushing means interposed between said remote ends of said arms and said axes, respectively, said axes being defined by pin means, and means for frictionally binding said bushing means to said remote ends of said arms and said pin means, whereby the swinging action of said arms is taken up in said bushing means.

10. Thrower apparatus comprising frame means, a pair of spaced apart pulleys journalled on said frame means, an endless conveyor trained over said pulleys, a pair of discs spaced apart laterally of the conveyor and engaging the upper run of the conveyor with substantial wrap to form the conveyor into a material receiving pocket with an inclined throwing surface, a chute leading into said pocket, said discs being secured to a shaft, said shaft being secured between a pair of spaced apart arms extending toward said pocket, said frame means carrying means for mounting the ends of said arms remote from the conveyor for pivotal movement about axes that converge generally in the direction of movement of the upper run of the conveyor, said discs including means adapted to be engaged by said conveyor on drift thereof to swing said arms in the direction of drift, said arms during normal operation of said conveyor being substantially parallel, but tending to swing out of parallelism when the last mentioned means of one of said discs is engaged by the conveyor on drift thereof, whereby the discs and said shaft are swivelled as a unit to oppose drift of the conveyor.

11. A conveyor belt aligning device comprising a support member including a pair of levers mounted at like ends for pivotal movement about axes that are at an angle to each other, and a pulley means member mounted between said levers by universal joint-like action coupling means, said pulley means member engaging said belt with substantial wrap, said axes converging in the direction of movement of the portion of the belt engaged on said pulley means member, one of said members including means for engaging the belt on drift thereof to swing said levers about their pivotal mountings in the direction of drift.

12. The device set forth in claim 11 wherein said axes are each defined by pin means, and including resilient bushing means encircling each of said pin means, means for fixing said levers to the respective bushing means, and means for fixing said bushing means to the respective pin means, whereby the swinging action of said levers is taken up in said bushing means, respectively.

References Cited in the file of this patent

UNITED STATES PATENTS

| 24,113 | Landrey | Jan. 24, 1956 |
| 2,569,419 | Kendall | Sept. 25, 1957 |

FOREIGN PATENTS

| 599,474 | Germany | July 3, 1934 |